(12) United States Patent
Posner et al.

(10) Patent No.: US 12,554,549 B2
(45) Date of Patent: Feb. 17, 2026

(54) PROVIDING DECISION INSTRUCTIONS FOR PROBLEM INCIDENTS

(71) Applicant: INTERNATIONAL BUSINESS MACHINES CORPORATION, Armonk, NY (US)

(72) Inventors: Keith Jeremy Posner, London (GB); David Jon Griffin, Reigate (GB); Luke Taher, London (GB); Matthew Richard James Thornhill, London (GB)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 17/980,838

(22) Filed: Nov. 4, 2022

(65) Prior Publication Data

US 2024/0152400 A1    May 9, 2024

(51) Int. Cl.
*G06F 9/50* (2006.01)
*G06F 9/38* (2018.01)

(52) U.S. Cl.
CPC ............ *G06F 9/505* (2013.01); *G06F 9/3836* (2013.01); *G06F 9/5072* (2013.01)

(58) Field of Classification Search
CPC ...................................................... G06F 9/505
See application file for complete search history.

(56) References Cited

U.S. PATENT DOCUMENTS

| | | | |
|---|---|---|---|
| 9,104,753 B2 | 8/2015 | Stuempfle | |
| 9,891,971 B1 * | 2/2018 | Kuhhirte | G06F 11/0709 |
| 10,673,787 B2 | 6/2020 | Koohmarey | |
| 10,783,453 B2 | 9/2020 | El Sayyed | |
| 10,904,383 B1 | 1/2021 | Thornhill | |
| 11,080,121 B2 | 8/2021 | Thornhill | |
| 2016/0224910 A1 * | 8/2016 | Deng | G06Q 30/016 |
| 2018/0365700 A1 | 12/2018 | Walthers | |

(Continued)

FOREIGN PATENT DOCUMENTS

WO    2020092956 A1    5/2020

OTHER PUBLICATIONS

Anonymous, "Method to Generate Quick Operational Insights from a Decision Tree Based Log Analysis", An IP.com Prior Art Database Technical Disclosure, Authors et. al.: Disclosed Anonymously, IP.com No. IPCOM000265170D, IP.com Electronic Publication Date: Mar. 8, 2021, 8 pages.

(Continued)

*Primary Examiner* — Charlie Sun
(74) *Attorney, Agent, or Firm* — Monchai Chuaychoo

(57) ABSTRACT

A method, computer program product, and computer system are described for providing decision instructions for problem incidents in information technology (IT) systems. The method includes categorizing incident instances as incident types, where an incident instance includes one or more events having resources identifying one or more hosts specific to the incident instance and wherein an incident type categorizes incident instances having a common underlying problem with the incident type having generalized resources. The method includes generating decision instructions for an incident type wherein the decision instructions provide generalized command steps for interacting with hosts for the resolution of incident instances of the incident type.

18 Claims, 9 Drawing Sheets

(56) References Cited

U.S. PATENT DOCUMENTS

| | | |
|---|---|---|
| 2019/0108470 A1 | 4/2019 | Jain |
| 2020/0004618 A1 | 1/2020 | Thornhill |
| 2020/0250022 A1 | 8/2020 | Li |
| 2020/0328961 A1 | 10/2020 | Puri |

OTHER PUBLICATIONS

Mell et al., "The NIST Definition of Cloud Computing", National Institute of Standards and Technology, Special Publication 800-145, Sep. 2011, pp. 1-7.

* cited by examiner

PROVIDING DECISION INSTRUCTIONS FOR PROBLEM INCIDENTS

BACKGROUND

The present invention relates to providing decision instructions for problem incidents in information technology systems, and more specifically, to generating decision instructions for problem incidents and using these to resolve incidents.

The monitoring and repair of information technology (IT) services in a client data center, cloud or hybrid environment can be difficult across the many layers of the services including: code, data, runtime, middleware, operating system, virtualization, servers, storage and networking. Across all the many layers it is key that all required components are operating correctly and that no parts of the system have failed.

When a failure does occur, the teams supporting the services need to know that an issue has occurred and need some way of finding out how to diagnose and fix the issue. IT service management software provides a means for support teams to track and assign these issues. Issues are assigned to a member of the support team, known as an operator, who is then responsible for resolving the issue, usually by issuing a sequence of computer commands on the affected systems. A common mechanism for fixing the issues is to provide a set of instructions to first responders called a runbook.

Frequently, operators are collaborating on collaborative chat platforms where multiple operators can communicate in a single place. There are existing technologies which allow the integration of operations management software directly into these collaborative environments, allowing operators to communicate with the software using natural language in the same place they communicate with each other. In many cases these technologies only allow operators to make simple queries against the event management system, for example "What resources are affected by this incident?".

SUMMARY

According to an aspect of the present invention there is provided a computer-implemented method for providing decision instructions for problem incidents in information technology (IT) systems, said method carried out by one or more processors of a computer system and comprising: categorizing incident instances as incident types, wherein an incident instance includes one or more events having resources identifying one or more hosts specific to the incident instance and wherein an incident type categorizes incident instances having a common underlying problem with the incident type having generalized resources; and generating decision instructions for an incident type wherein the decision instructions provide generalized command steps for interacting with hosts for the resolution of incident instances of the incident type.

According to another aspect of the present invention there is provided a computer-implemented method for resolving decision instructions for problem incidents in information technology (IT) systems, said method carried out by one or more processors of a computer system and comprising: determining an incident type of a current incident instance wherein an incident type categorizes incident instances having a common underlying problem with the incident type having generalized resources; referencing decision instructions provided for the incident type wherein the decision instructions provide generalized command steps for interacting with the generalized resources for the resolution of incident instances of the incident type; and converting generalized resources of the incident type to one or more hosts specific to the current incident instance identified from one or more events in the current incident instance.

According to a further aspect of the present invention there is provided a system for providing decision instructions for problem incidents in information technology (IT) systems, comprising: a processor and a memory configured to provide computer program instructions to the processor to execute the function of the components: an incident type categorizing component for categorizing incident instances as incident types, wherein an incident instance includes one or more events having resources identifying one or more hosts specific to the incident instance and wherein an incident type categorizes incident instances having a common underlying problem with the incident type having generalized resources; and a decision instruction generating component for generating decision instructions for an incident type wherein the decision instructions provide generalized command steps for interacting with hosts for the resolution of incident instances of the incident type.

According to a further aspect of the present invention there is provided a system for resolving decision instructions for problem incidents in information technology (IT) systems, comprising: a processor and a memory configured to provide computer program instructions to the processor to execute the function of the components: an incident type determining component for determining an incident type of a current incident instance wherein an incident type categorizes incident instances having a common underlying problem with the incident type having generalized resources; an instruction referencing component for referencing decision instructions provided for the incident type wherein the decision instructions provide generalized command steps for interacting with the generalized resources for the resolution of incident instances of the incident type; and a resource converting component for converting generalized resources of the incident type to one or more hosts specific to the current incident instance identified from one or more events in the current incident instance.

According to a further aspect of the present invention there is provided a computer program product for providing decision instructions for problem incidents in information technology (IT) systems, the computer program product comprising a computer readable storage medium having program instructions embodied therewith, the program instructions executable by a processor to cause the processor to: categorize incident instances as incident types, wherein an incident instance includes one or more events having resources identifying one or more hosts specific to the incident instance and wherein an incident type categorizes incident instances having a common underlying problem with the incident type having generalized resources; and generate decision instructions for an incident type wherein the decision instructions provide generalized command steps for interacting with hosts for the resolution of incident instances of the incident type.

According to a further aspect of the present invention there is provided a computer program product for resolving decision instructions for problem incidents in information technology (IT) systems, the computer program product comprising a computer readable storage medium having program instructions embodied therewith, the program instructions executable by a processor to cause the processor to: determine an incident type of a current incident instance wherein an incident type categorizes incident instances having a common underlying problem with the incident type having generalized resources; reference decision instructions provided for the incident type wherein the decision instructions provide generalized command steps for interacting with the generalized resources for the resolution of incident instances of the incident type; and convert generalized resources of the incident type to one or more hosts specific to the current incident instance identified from one or more events in the current incident instance.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the accompanying drawings.

Figure 1A:
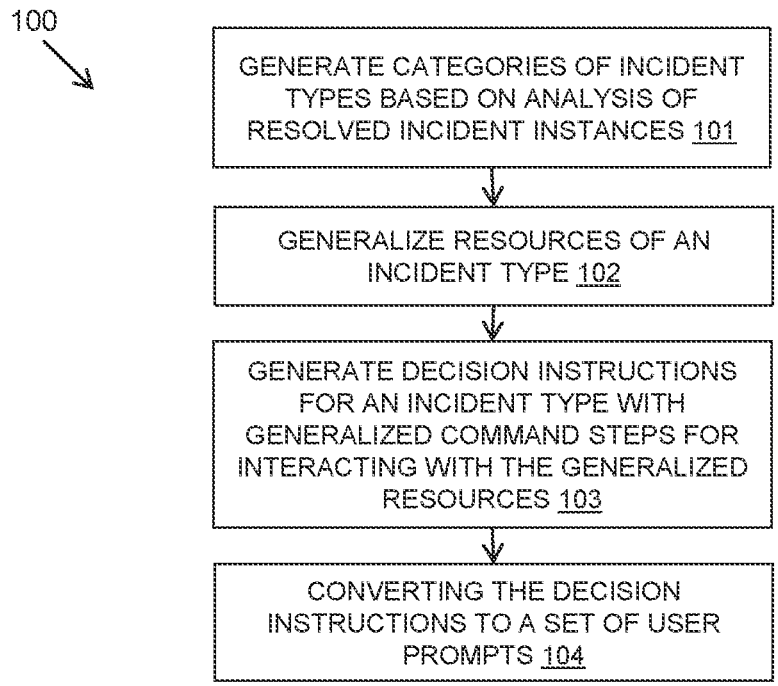
FIG. 1A is a flow diagram of an example embodiment of an aspect of a method in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for the generation of decision instructions for problem incidents in IT systems and the application of the decision instructions to resolve current incidents. The method, system and computer program product generate and resolve decision instructions for problem incident instances based on categorizing incident instances as incident types for which decision instructions are generated.

The system may include a current incident resolving component for resolving a current incident instance by determining a current position in the decision instructions of an incident type in which the current incident instance is categorized and progressing through the decision instructions.

The current incident resolving component may include a resource converting component for converting a generalized resource in the incident type to one or more hosts specific to the incident instance identified from events in the current incident instance.

The system may include a prompt conversion component for converting the decision instructions for an incident type to a set of prompts in the form of a conversation tree of an online messaging interface for user interaction with the decision instructions.

A method is described of generating decision instructions from terminal commands entered by an operator in the diagnosis and resolution of IT service incidents. The decision instructions represent the different steps taken by the operator when addressing a given type of IT service incident. Decision instructions may be built from resolved trouble tickets where the resolution steps are captured along with the commands used. A post mortem may capture the problem and may capture the steps taken in order to create a decision tree.

A runbook is a set of one or more static instructions that enables an operator (manually or automated) to carry out a specific task such as to start/stop a virtual machine. The described decision instructions are dynamic in that they provide the next step (decisions) based on the where an operator is in a decision branch. The decision instructions are based on how operators have resolved similar incidents in the past.

A method is also described of applying generated decision instructions to future incidents of the given type. This includes resolving a given state of an assigned operator in addressing an incident by determining the operator's current position in the decision instructions. By utilizing the decision instructions and the current position of the assigned operator in the diagnostic and resolution process, the operator may be prompted with suggested next steps. This provides a means for assisting operators with limited domain knowledge, by providing them with the domain knowledge encoded in the decision tree by other operators.

Automated incident resolution assistance in IT services is an improvement in the technical field of computer performance generally and more particularly in the technical field of resolving technical IT service issues.

In one embodiment, incident resolution assistance may be provided through a chatbot driven interface where a conversation tree is programmatically derived from the decision instruction. A chatbot is defined as a software application used to conduct an online conversation via a messaging platform.

Referring to FIG. 1A, a flow diagram 100 shows an example embodiment of the described method for generating decision instructions for problem incidents in information technology (IT) systems. It should be noted that the steps of the flow diagram may be carried out in a different order to that shown in the flow diagram 100.

The method may generate 101 categories of incident types based on analysis of a set of resolved incident instance sessions with generalized commands and responses to and from one or more problem hosts. An incident type categorizes incident instances having a common underlying problem. The categorizing of incident instances as incident types may be based on one or more of: events within an incident instance; steps taken by an operator to resolve an incident instance; tickets raised against an incident instance; and teams and/or operators assigned to an incident instance.

Generating categories of incident types may include generalizing 102 resources of an incident type. Generalizing resources may include identifying common resource fields within events of a subset of resolved incident instances of the incident type that are used to connect to the problem hosts. The common resource fields used to source the problem hosts across a group (for example, a majority or threshold number) of the subset of resolved incident instances are generalized as contextual host information for the incident type. Without generalizing the resources it is difficult to get enough data to create an interactions graph.

The method may generate 103 decision instructions for an incident type providing generalized command steps for interacting with the generalized resources. The generalized resources relate to hosts for the resolution of incident instances of the incident type. The decision instructions may be in the form of a decision tree or other form of decision graph or diagram, or in the form of a table or a set of rules.

Generating decision instructions for an incident type may be based on analysis of a set of resolved incident instance sessions of the incident type with generalized commands and responses to and from one or more generalized resources.

Generating decision instructions may include comparing generalized commands to: add common sub-sequences of complete commands to the instructions, with one node per command with an incoming directed connection to any previous commands; add divergent sub-sequences of complete commands as conditional paths in the instructions based on tokenized parameters; and process and add common sub-sequences of partial commands to the instructions as described further below.

The method may convert 104 the decision instructions for an incident type to a set of prompts for user interaction with the decision instructions. For example, the set of prompts may be a conversation tree of an online messaging interface such as a chatbot.

Figure 1B:
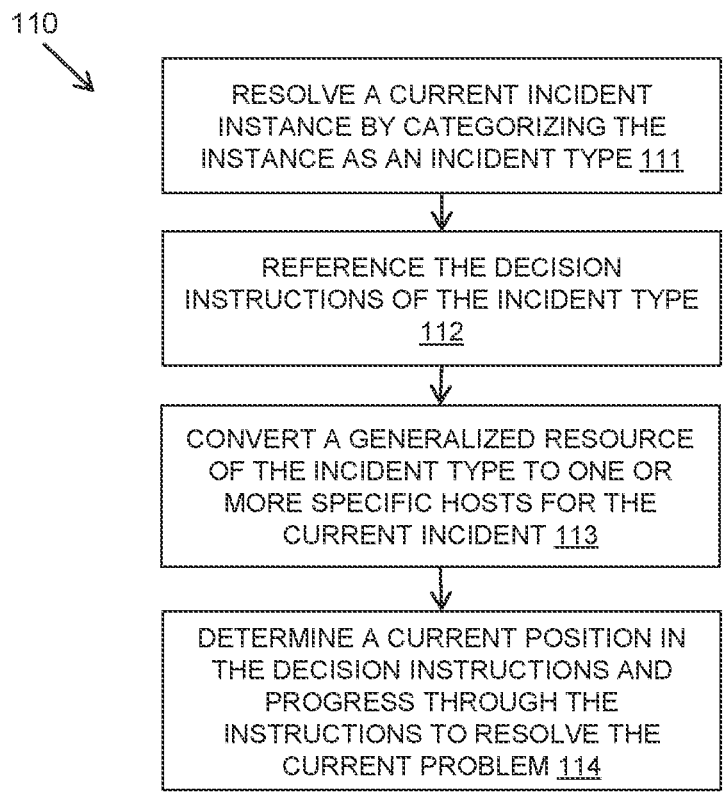
FIG. 1B is a flow diagram of an example embodiment of another aspect of a method in accordance with embodiments of the present invention.

Referring to FIG. 1B, a flow diagram 110 shows an example embodiment of the described method for resolving a current incident based on decision instructions for problem incidents in information technology (IT) systems. It should be noted that the steps of the flow diagram may be carried out in a different order to that shown in the flow diagram 110.

The method may resolve 111 a current incident instance by categorizing the current incident instance as an incident type and referencing 112 a previously generated set of decision instructions for the incident type. This may include interacting in an online session of prompts generated by the decision instructions.

The method may convert 113 a generalized resource in the incident type to one or more hosts specific to the current incident instance identified from events in the current incident instance.

The method may determine 114 a current position in the decision instructions of the incident type and may progress through the decision instructions to resolve the current incident instance.

Figure 2:
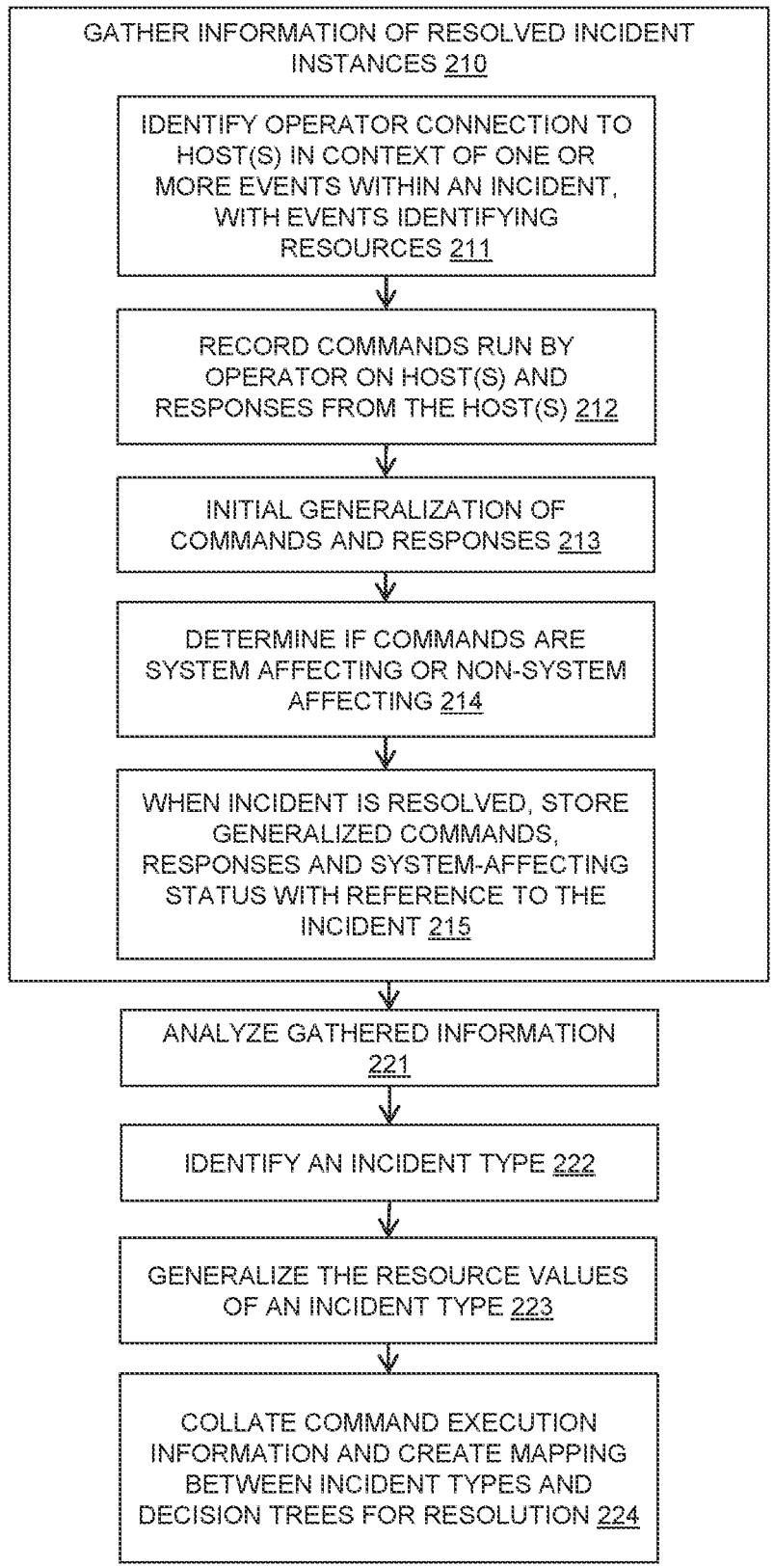
FIG. 2 is a flow diagram of an example embodiment of a further aspect of the method in accordance with embodiments of the present invention.

Referring to FIG. 2, a flow diagram 200 shows an example embodiment of an aspect of the described method of recording incident instance resolution information by operators and analyzing the information to determine incident types.

The method may gather information of resolved incident instances 210. The method may record session information relating to incident instance resolution by an operator in the form of commands and responses. The incident instance record may include generalized resolution information including generalized commands and responses with a reference to the incident instance. The incident instance record may also include a system affecting status of commands with a reference to the incident instance. The generalization of the commands and responses and the determination of system affecting status of commands may be carried out at the time of the recording of the information or, alternatively, when analyzing recorded information relating to a set of past incident instances.

For each incident instance, the method may identify 211 an operator connection to one or more hosts in a context of one or more events within an IT services incident. When an operator is assigned an incident, their job is to investigate and identify the underlying problem, or root cause, before performing actions to resolve the problem. These actions are often embodied as commands run in a command line interface (CLI) session connected to one or more hosts on which the problem has occurred and identified by the events in the incident. The events in the incident will have host identifying fields called resources which allow the operator to connect to the hosts specific to the given incident.

Once the operator has connected to one or more hosts in the context of an incident, the method may record 212 the commands run by the operator on host(s) using CLI session(s) and the responses received from the host(s). The responses may include any textual output of the command as well as the status code.

The commands and responses may be initially generalized 213. The initial generalization acts to parameterize any matches between the originating event attributes and command arguments.

The commands and resources may be generalized by locating instances of event attribute values within the commands and responses and replacing them with placeholders via string matching.

The commands may be generalized by using the method described in United States Patent Application Publication No. US 2020/0004618, the contents of which is incorporated herein by reference, in which the generalization of commands uses matching of command arguments to event metadata for command set generalization. Each recorded command is split into a command and a list of arguments. For each argument, the method may check if the argument matches a metadata field of event metadata for each event in the event group. If there is no match, the attribute is kept static. For any matches, the matching tokens are replaced with parameters allowing the commands to be used for other resources affected by similar issues. In this way, the command is generalized.

It may be determined 214 if a command is system-affecting or not, with a system affecting command changing a state of the system. Each command may be signified as being either system affecting, or non-system affecting based on predefined lists of system affecting commands and/or the measurement of changes to the system in response to a command. Whether a command is system-affecting or non-system affecting may be used to present data to the operator automatically to help them decide what to do. System-affecting commands may run automatically if operators have determined that a set of steps is suitable to be carried out without intervention. Non-system affecting data may be used as an input for a system affecting command.

The method may use the method disclosed in US 2020/0004618, in which a command is matched against a predefined set of commands which are known to be system affecting or known to be non-system affecting and categorized according to the match. For commands that do not match the predefined set of commands, the system calculates a confidence or probability of each command being system affecting. This probability may be calculated through the combination of a number of sources, including, for example, performance, logs, command history, other events, configuration changes, etc. For example, the system affecting confidence may be based on one or more of: determining the frequency of use of the command from the previous command history of a given resource; through use of monitoring of system configuration through a configuration management solution to determine which commands caused configuration changes on a resource; monitoring of changes to the file system of a resource to determine which commands enacted changes; measuring changes in performance metrics of affected resources in order to determine if the commands changed the metrics in a statistically significant way; and monitoring of changes to the resolution status of the event group to determine which commands or sessions enacted changes. It may be determined if the system affecting confidence level of a command is greater than a defined threshold. If so, it is categorized as system affecting. If not, it is categorized as non-system affecting.

Once an incident is resolved, the method may store 215 the generalized commands, command responses and system-affecting status with a reference to the incident instance they were executed in the context of.

The method may analyze 221 the gathered resolved incident information to identify incident types 222. An incident type is identified by having the same or similar underlying problems and requiring of the same diagnostic and resolution steps. This may be carried out initially on a set of incident instances to generate incident types that may evolve as more incident instances are resolved of that type.

Similar incidents may occur which are of the same incident type as identified by having the same or similar underlying problems and are requiring of the same diagnostic and resolution steps. Incidents of the same type may occur on different hosts and therefore the hosts are generalized as resources. However, operators are able to identify, for a given incident instance, which hosts to connect to based on the events in the incident and the hosts on which they have occurred.

The method may identify 222 an incident type as a category to which multiple incident instances belong. The incident type represents a given problem scenario which may occur against different collections of resources. An example of a problem scenario would be "disk space low", followed by "disk space critical" and finally "service down". This pattern of failures may occur against multiple different resources over different incidents, but would represent a single abstract incident type.

For each incident instance, the method may identify the type as determined by, but not limited to, one or more of the following: the events within the incident; the steps taken by an operator to resolve the incident; the tickets raised against the incident; and the teams and operators assigned to the incident.

The method may generalize 223 on the resource values of an incident type. For the subset of incident instances of each type, the following may be carried out to generalize the resource values of an incident type. Resource fields within the events may be identified which have been used in connecting to the problem hosts. It may be determined if one or more common resource fields were used to source the problem hosts across a majority of the subset of incidents. If the majority of incidents within a subset have the common resource fields, these common resource fields may be generalized as contextual host information for future incidents of this incident type. The contextual host information which differs between incident instances of the incident type is replaced with an abstract resource token.

The method may collate 224 the command execution information previously recorded for incident instances of an incident type in order to create a mapping between abstract incident types and typical decision instructions for resolution. This process is described further below in relation to FIG. 3A. The collation 224 may be carried out after each incident instance resolution or by analyzing a set of past incident instance resolutions.

Figure 3A:
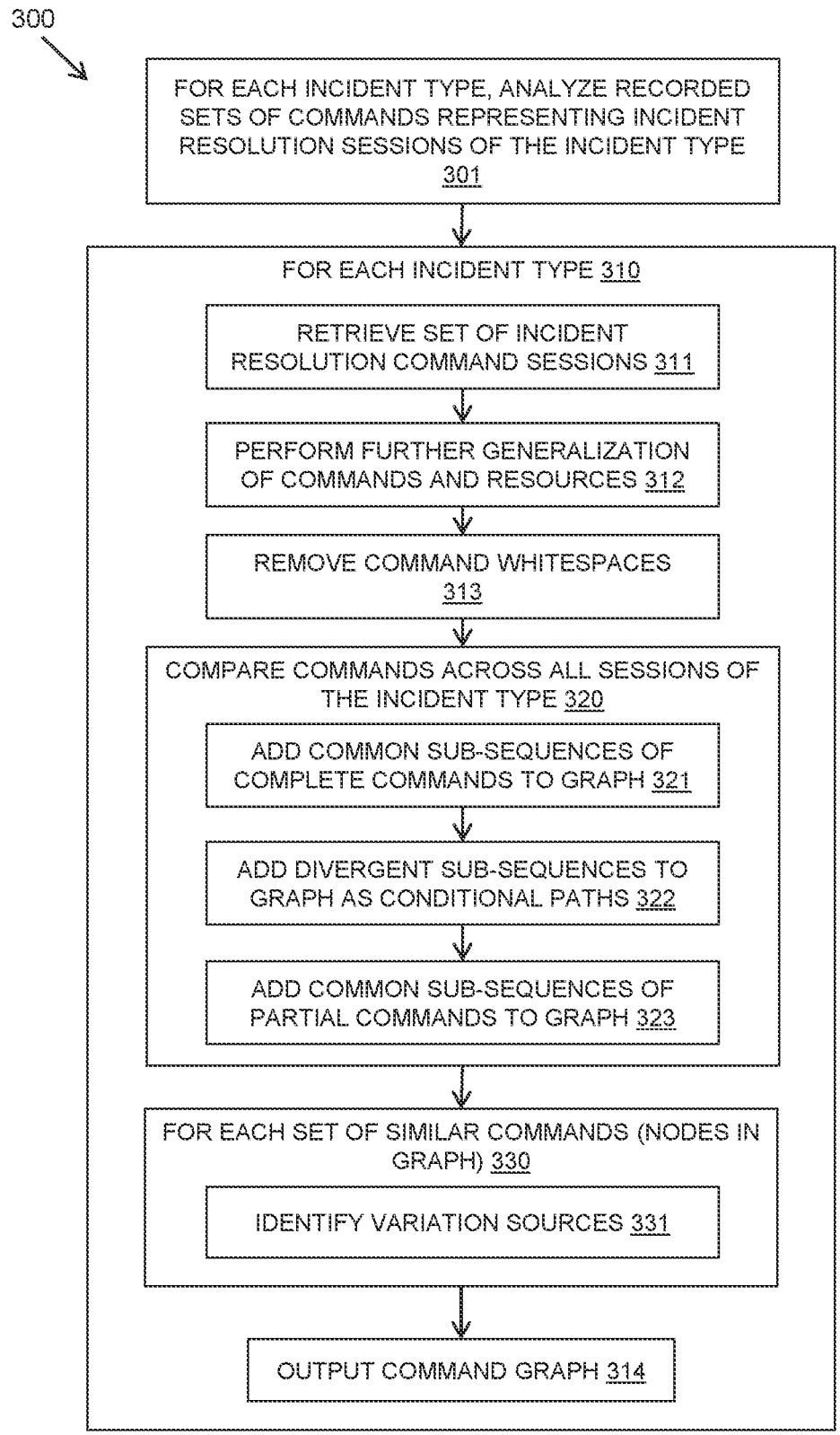
FIG. 3A is a flow diagram of an example embodiment of a further aspect of the method in accordance with embodiments of the present invention.

Referring to FIG. 3A, a flow diagram 300 shows an example embodiment of an aspect of the described method of generating decision instructions for an incident type. In this example, the decision instructions are provided as a decision graph, such as a decision tree.

The method may analyze 301 recorded information for sessions of previous resolved incident instances of an incident type. This may be carried out for each incident type.

For each abstract incident type 310, the collection of recorded sets of commands is retrieved 311 with each set of commands representing an incident resolution session. A recorded set of commands may include the command execution information of generalized commands, responses, and the system affecting status of commands. The recorded set of commands of the sessions are compared with each other to generate a graph of possible interactions.

For each incident resolution session, a further generalization 312 is performed between commands and responses. This further generalization 312 builds on the initial generalization 213 carried when gathering information on resolved incident instances 210. The initial generalization 213 acts to parameterize any matches between the originating event attributes and command arguments and the further generalization 312 builds on this to also parameterize any command arguments which appear in the responses from previous commands and are likely to correspond to each other.

The further generalization 312 may include performing string matching performed against each command response and the arguments for commands that are executed sometime after that response. String matches are constrained, for example by only finding strings of a significant length, which take certain forms (e.g., a host name) or are located in significant parts of the response. Where a match is found, the string is replaced in both the response(s) and the command(s) with a defined response token.

For example, there may be a command 1, 'ls-l', which responds with a directory listing:
big-log-file.log 500 Gb
someotherfile.log 10b If this is then followed by command 2 'rm big-log-file.log', the method may match big-log-file.log in the response of command 1 to the argument of command 2.

Commands may be pre-processed to remove 313 any additional whitespace characters. This may remove trailing command whitespaces.

The method may compare 320 commands across the different incident sessions of the incident type as follows. A common sub-sequence or diffing algorithm may be used to identify both common sub-sequences and divergences between the command sets. For example, The Myers Difference Algorithm or Hunt-McIlroy Algorithm may be used.

The following algorithm may be used to recursively reconcile sub-sequences:

(a) Common sub-sequences which consist of one or more complete commands are taken as common across all command sets and so added 321 into the decision graph, with one node per command with an incoming directed connection to any previous command in the graph.

(b) Divergent sub-sequences are added 322 as conditional paths in the graph based on the tokenized parameters of the given sessions identified as common in previous commands within the sessions.

(c) Common sub-sequences which consist of partial commands are processed and added 323 to the graph as follows:

(i) If the first space separated substring of the command (i.e., the base command) is different, then the commands are considered divergent and treated as above in (b).

(ii) If the subsequence space separated substrings differ, the commands are treated as the same but with different parameters, this implies non-tokenized parameters vary between the commands across sessions. For each session, the entropy of each non-tokenized parameter in the command is established based on its occurrence in previous commands and command outputs in the session compared to other sessions, this is used to calculate the information content of the occurrence of the parameter in this command. If the information content of one or more of the non-tokenized parameters in the command is low across all sessions, then this is considered to be a significant variant of the command and the command variant is added as a conditional path in the graph as in (b). If the information content is high, then the variant is considered to be noise and is ignored as a variant. If there is no significant variant for the command and the command appears in the majority of sessions then the variant with the lowest information content is selected as a non-conditional path. Otherwise, the command is discarded.

(iii) For each set of similar commands, the responses to their execution are compared in order to identify parts of the response that are either static or vary between executions. For those parts that vary (response tokens), the system attempts to derive a source for the variation. Each response token is compared to the arguments to the command, the attributes of the events and the arguments to other commands for the corresponding session. Where there is a consistent match between a token and a command argument/event attribute across the majority of sessions, this token is matched to that token source and the response is generalized. Any remaining response tokens (unresolved response tokens) are stored alongside each command.

(iii) describes one method for how the method can determine which branch to take in the graph. The first step of this is comparing each output of each command across sessions and determining which parts of the output tend to vary. These can then be compared to the various different sources listed (e.g., event attributes, parameters to other commands) to gain an understanding of where that variation is derived from. For those tokens that vary but have no clear source, these can be later analyzed to match them up with the command branches that frequently follow those variations and drive the system to follow that branch when executing the graph.

For each set of similar commands (nodes in the graph) 330, variation sources are identified 331.

Once the confidence level in a decision tree, or a subtree, is sufficient it can be used to help operators resolve future incidents of that incident type. The confidence level may be determined based on the number of times a given branch has been taken by operators against similar incidents in the past. A further embodiment is to take into account the skill level of operators who have taken certain branches in the past, and use that to positively weight the confidence value of those branches. This skill level may be calculated for a group of commands as described in U.S. Pat. No. 10,904,383B1 the contents of which is incorporated herein by reference.

Once the system has a graph of possible interactions, it is possible to output 314 the command graph and apply them to a new incident resolution process. In one embodiment, the resolution can be applied to ChatOps where a collaboration computer application such as Slack™ can interact with human conversations. In many instances the interactions are with chatbots. Chatbots are applications that enhance the user experience and the chatbot may be used to monitor the conversation and interactions made within the collaboration tool such as Slack™.

A worked example is given below using example sessions across a given incident type. The example is given in OpenShift™ Container Platform for managing container-based applications using OpenShift™ CLI "oc".

Sessions 1, 2, 3, 4
---------
1.1 oc get po
1.2 oc describe po [pod]
1.3 oc delete po [pod]
1.4 verify-connectivity
Sessions 5, 6, 7, 8
---------
5.1 oc get po
5.2 oc get nodes
5.3 oc describe node [node]
5.4 oc debug node/worker-0
5.5 reboot
5.6 exit
5.7 verify-connectivity
Session 9
---------
9.1 oc get po
9.2 oc persistantvolumes
9.3 oc persistantvolume data-kafka-abc321
9.4 verify-connectivity The method may identify any common or different subsequences across all the sessions. 'oc get po' appears in all sessions, so this is an example of a common subsequence that falls within (a) of the above algorithm and this subsequence is added to the graph as it is.

Commands 1.2/1.3 differ from 5.2/5.3 only by their parameters. In this case, all parameters have a low information content as they appear in a large number of the sessions and are not unique to a small set of them. These command variants are therefore added as branches to the graph.

Commands 9.2/9.3 only differ from 1.2/1.3 and 5.2/5.3 by arguments, but in this case the arguments have a high information content. They only appear within this command session. These command variants are therefore dropped as they are likely to be very specific to that particular session and not applicable to the incident type as a whole.

Figure 3B:
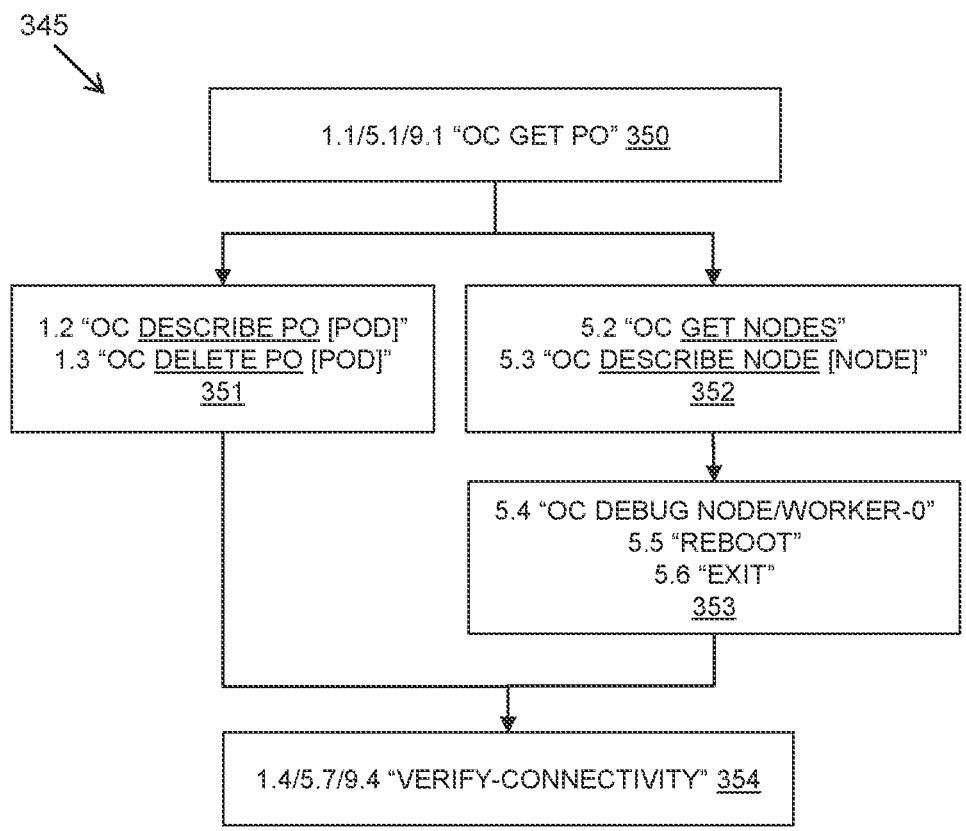
FIG. 3B is an example decision instruction graph.

A resulting decision instruction graph 345 is shown in FIG. 3B. The graph 345 starts 350 with the common subsequence "oc get po" that is common to all the sessions 1.1/5.1/9.1.

The graph 345 branches (from 350) to two branches 351, 352 for the commands 1.2/1.3 of 1.2 "oc describe po [pod]" and 1.3 "oc delete po [pod]" and for the commands 5.2/5.3 of 5.2 "oc get nodes" and 5.4 "oc describe node [node]. The underlined parameters have low information content (for example, they are non-surprising or appear frequently across sessions) and are therefore included in the graph. A branch is not added for the commands 9.2/9.3 of 9.2 "oc persistantvolumes" and 9.3 "oc persistantvolume data-kafka-abc321" as these parameters that have high information content (and therefore only appear in a small number of sessions, in this case only one session).

The graph 345 includes the intermediate steps 353 under 352 of 5.4 "oc debug node/worker-0", 5.5 "reboot", and 5.6 "exit".

The graph 345 includes the final command 354 from all sessions of "verify-connectivity" of 1.4/5.7/9.4.

Figure 4:
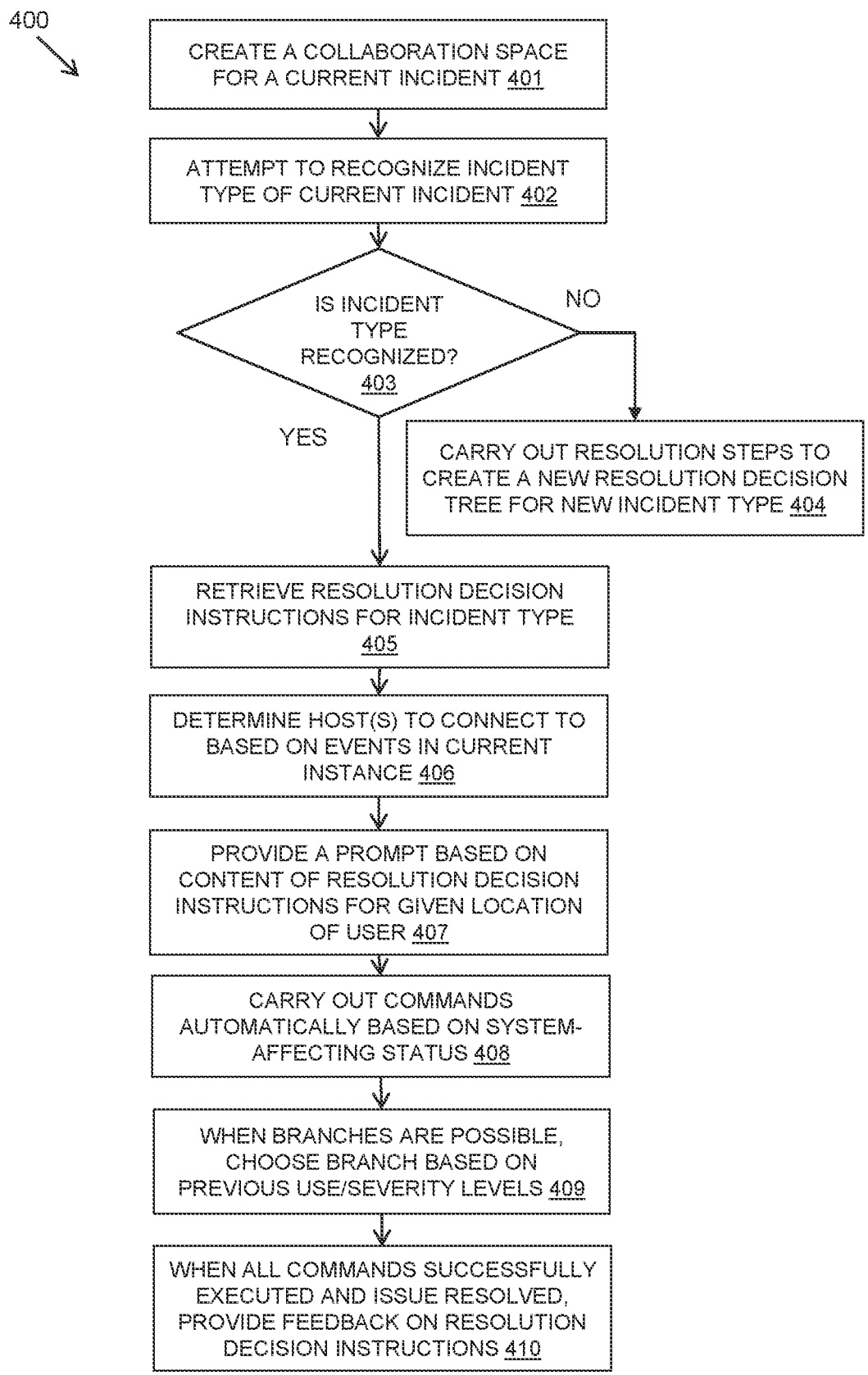
FIG. 4 is a flow diagram of an example embodiment of a further aspect of the method in accordance with embodiments of the present invention.

Referring to FIG. 4, a flow diagram 400 shows an example embodiment of a resolution of a current incident instance using the generated decision instructions for an incident type.

The method may create 401 a collaboration space for a current incident instance. The system that is managing the incident may create a collaboration space in which the incident may be posted.

The method may attempt 402 to recognize the incident type of the current incident instance. It may be determined 403 if an incident type is recognized. If an incident type is not recognized, the method may carry out 404 conventional resolution steps in a session for the current incident instance and the session may be used to create resolution decision instructions for a new incident type.

If the incident type is recognized, the method may retrieve 405 the resolution decision instructions for the incident type. The method may determine 406 one or more hosts to connect to, based on events in the current incident instance.

The method may provide prompts 407 based on the content of the resolution decision instructions for a given location of the user in the decision instructions. For example, this may be a position in a decision tree.

Some commands may be carried out automatically 408 based on the system-affecting status of the commands. Any non-system affecting commands may run automatically or may be confirmed before executing. The same may be applied to certain system-affecting commands based on rules, roles and participant.

Non-system affecting commands may be used to provide parameters for either a different non-system affecting command or a system affecting command. It may be determined if the output can be run or seen depending on rules, roles, and participants. In general running the non-system affecting command would save time in any decision making process.

When options or branches are possible in the decision instructions, an option may be chosen 409 based on previous use or severity levels.

In one example, the options or branches may be taken based on previous use where the operator may have seen the incident before and used the options in a particular order. It may happen that an option or branch may increase a particular pod severity and that may require different actions to be carried out due to access.

When all commands have been successfully executed, the issue will be resolved and feedback may be provided 410 on the resolution decision instructions.

As an example, in a workplace messaging application, such as Slack™, a channel or space may be created for an incident resolution. Alternatively, an existing channel may be used for participants such as an operator, manager, Level 3 support. A resolution application may be provided to provide prompts from an interactions graph based on resolution decision instructions for an incident type. The resolution application may include a resolution chatbot to provide the prompts as a message conversation.

In an example, the incident may be posted as:
"Crash loop backoff for Deployment
dns-default
Namespace openshift-dns
Cluster: my-openshift.example.com"

The resolution chatbot may attempt to recognize the incident as an incident type. For each incident, the type may be identified as determined by, but not limited to, one or more of the following: the events within the incident; the steps taken by an operator to resolve the incident; or the tickets raised against the incident. It could be possible to apply a number of different actions to lookup the incident. For example, these may include regex, natural language processing or some other matching mechanism.

In this example, the command is getting the status of the pods. The status for one of the pods is CrashLoopBackoff. The status of "CrashLoopBackoff" is recognized as an incident type. This may use various methods to match the result as an incident type.

The teams and operators assigned to the incident.

The resolution chatbot may determine a start point in the interactions graph for the incident type. If the chatbot recognizes the incident type, it can provide a response depending on the content of the interactions graph.

If the commands within the integrations graph are non-system affecting, the chatbot application can immediately action and provide the result. The command is getting information that can be used in the decision making process. In this instance, it is getting "Status".

In the example, the response could look like:
{Current Pod Status}:
CMD: oc get po
RES:
NAME READY STATUS RESTARTS AGE
dns-default-8qrcl 2/2 Running 3 12d
dns-default-ch7kd 2/2 Running 2 12d
dns-default-kbzff 0/2 CrashLoopBackoff 300 12d dns-default-mw8dj 2/2 Running 3 12d
dns-default-nfc4n 2/2 Running 2 12d
dns-default-nwfwg 2/2 Running 4 12d
dns-default-tzpwn 2/2 Running 3 12d dns-default-v9tmq 2/2 Running 3 12d The command is getting the status of the pods. The status for one of the pods is CrashLoopBackoff. The status "CrashLoopBackoff" is recognized as an incident type and therefore, if seen before, it can be used to suggest the resolution path.

If the chatbot recognizes the incident type, a message may be provided into the chat with an action statement such as:
 {This incident has been seen X number of times before. Would you like to see the resolution steps?}

If the chatbot does not recognize the incident type, it can provide a response such as:
 {This incident has not been seen before, suggested actions:}

If the incident type is not found, the participants may go through the resolution steps outlined earlier to create new resolution decision instructions. Once the incident is resolved, the next step in the process would be the incident closure.

The chatbot may look at the interactions graph and provide a best fit action based on the type of incident. Once best fit suggestion is found, the chatbot may move to the command response cycle outlined below.

In a command response cycle, the chatbot may interact with the collaboration tool and provide guided assistance to step through the interactions graph. Based on the historical resolution of an incident, the chatbot will provide the next action to carry out. The implementation of the command response cycle may be carried out in a number of ways. For example, any non-system affecting commands may run automatically or may be confirmed before executing. Certain system affecting events may be run automatically or may be confirmed before executing based on rules, roles and participant. As an example, the chatbot could create the following message for the example:
 chatbot: Run command—oc delete po dns-default-kbzff?
 participant: yes
 chatbot: Command completed successfully
 chatbot: Result—Deleted dns-default-kbzff Once a command has been successful, the chatbot may move to the next action within the interactions graph. The chatbot may continue to interact with the collaboration tool until it has completed all interactions for an incident.

Where an incident is complex the interactions graph may come to a point where a number of branches are possible. If one or more branches are possible, the chatbot application may use a number of methods to determine the best path and present the choices to the operator. The methods may include determining a number of times each path has been used or determining the severity levels for the incident. The operator may choose the action to be taken. The action will be recorded to provide more informed choice the next time the incident type is seen.

Once all commands have been successfully executed and the issue resolved the chatbot application may provide feedback to the operator that the incident is fixed:
 {This incident is fixed}

Once fixed, the chatbot application may interact with other systems such as the incident management system. The interactions with the other systems may follow a process to close the incident.

The natural language provided by the chatbot shown in { } may be created and updated via dictionaries and other learning techniques that can be applied to chatbots.

Figure 5:
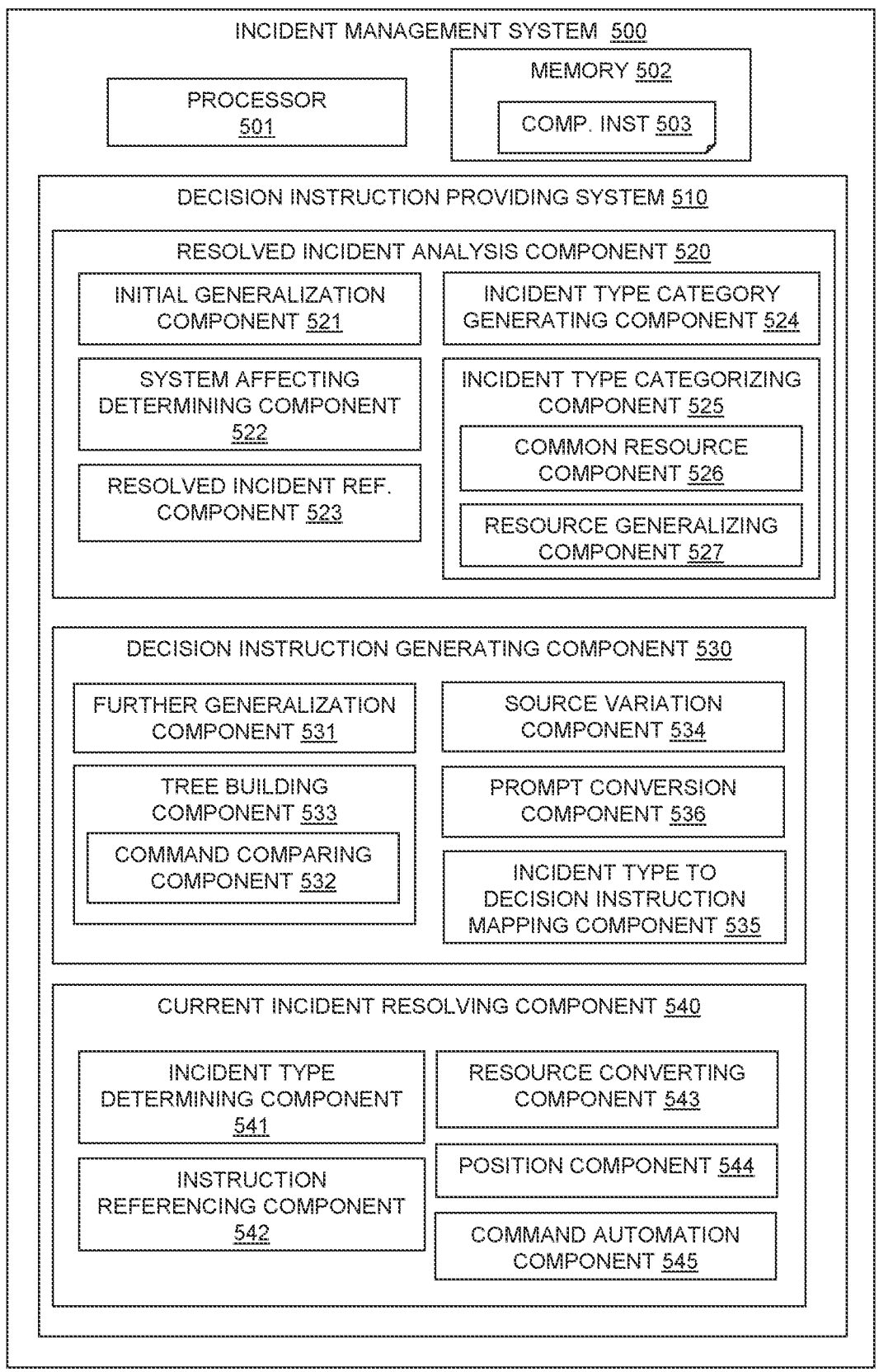
FIG. 5 is block diagram of an example embodiment of a system in accordance with embodiments of the present invention.

Referring to FIG. 5, a block diagram shows an example embodiment of an incident management system 500 in which the described method may be implemented. The incident management system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The incident management system 500 includes an example embodiment of a decision instruction providing system 510 for providing sets of decision instructions for incident types as described herein.

The decision instruction providing system 510 includes a resolved incident analysis component 520 for gathering and analyzing records of resolved incident instances. This may include analyzing historical resolved incidents and updating the analysis with newly resolved incident instances.

The resolved incident analysis component 520 may include components for analyzing individual incident instances including an initial generalization component 521 for initially generalizing commands by parameterizing any matches between the originating event attributes and command arguments and a system affecting determining component 522 for determining if commands are system affecting or not. The resolved incident analysis component 520 may include a resolved incident reference component 523 for storing generalized commands and responses and system affecting status with reference to the resolved incident.

The resolved incident analysis component 520 may include an incident type category generating component 524 for generating categories of incident types based on analysis of a set of resolved incident instance sessions with initially generalized commands and responses to and from one or more problem hosts.

The resolved incident analysis component 520 may include an incident type categorizing component 525 for categorizing incident instances as incident types, wherein an incident instance includes one or more events having resources identifying one or more hosts specific to the incident instance and wherein an incident type categorizes incident instances having a common underlying problem with the incident type having generalized resources;

The resolved incident analysis component 520 may include a common resource component 526 for identifying common resource fields within events of a subset of incident instances of the incident type used to connect to one or more problem hosts and a resource generalization component 527 for generalizing the common resource fields across a threshold of the subset of resolved incident instances as contextual host information for the incident type.

The decision instruction providing system 510 includes a decision instruction generating component 530 for generating decision instructions for an incident type with the decision instructions providing generalized command steps for interacting with hosts for the resolution of incident instances of the incident type. The decision instructions for an incident type may be provided as a decision tree having generalized commands.

The decision instruction generating component 530 may include a further generalization component 531 for further generalizing commands and responses by building on the initial generalization with further generalization parameterizing any command arguments which appear in the responses from previous commands and correspond to each other.

The decision instruction generating component 530 may include a tree building component 533 for determining required paths and branches of decision instructions including a command comparing component 532 for comparing commands to determine common subsequences and divergent subsequences. The decision instruction generating component 530 may include a source variation component 534 for identifying variation sources for each set of similar generalized commands.

The decision instruction generating component 530 may include a prompt conversion component 536 for converting the decision instructions for an incident type to a set of prompts in the form of a conversation tree of an online messaging interface for user interaction with the decision instructions.

The decision instruction generating component 530 may include an incident type to decision instruction mapping component 535 for reference to the generated sets of decision instructions for incident types.

The decision instruction providing system 510 includes a current incident resolving component 540 for resolving a current incident instance by determining a current position in the decision instructions of an incident type in which the current incident instance is categorized and progressing through the decision instructions.

The current incident resolving component 540 may include a resource converting component 543 for converting a generalized resource in the incident type to one or more hosts specific to the incident instance identified from events in the current incident instance.

The current incident resolving component 540 may include an incident type determining component 541 for determining an incident type of a current incident instance wherein an incident type categorizes incident instances having a common underlying problem with the incident type having generalized resources.

The current incident resolving component 540 may include an instruction referencing component 542 for referencing decision instructions provided for the incident type wherein the decision instructions provide generalized command steps for interacting with the generalized resources for the resolution of incident instances of the incident type.

The current incident resolving component 540 may include a position component 544 for resolving the current incident instance by determining a current position in the decision instructions of an incident type in which the current incident instance is categorized and progressing through the decision instructions.

The current incident resolving component 540 may include a command automation component 545 for carrying out a command in the decision instructions automatically or with a confirmation input based on whether the command is non-system affecting.

Figure 6:
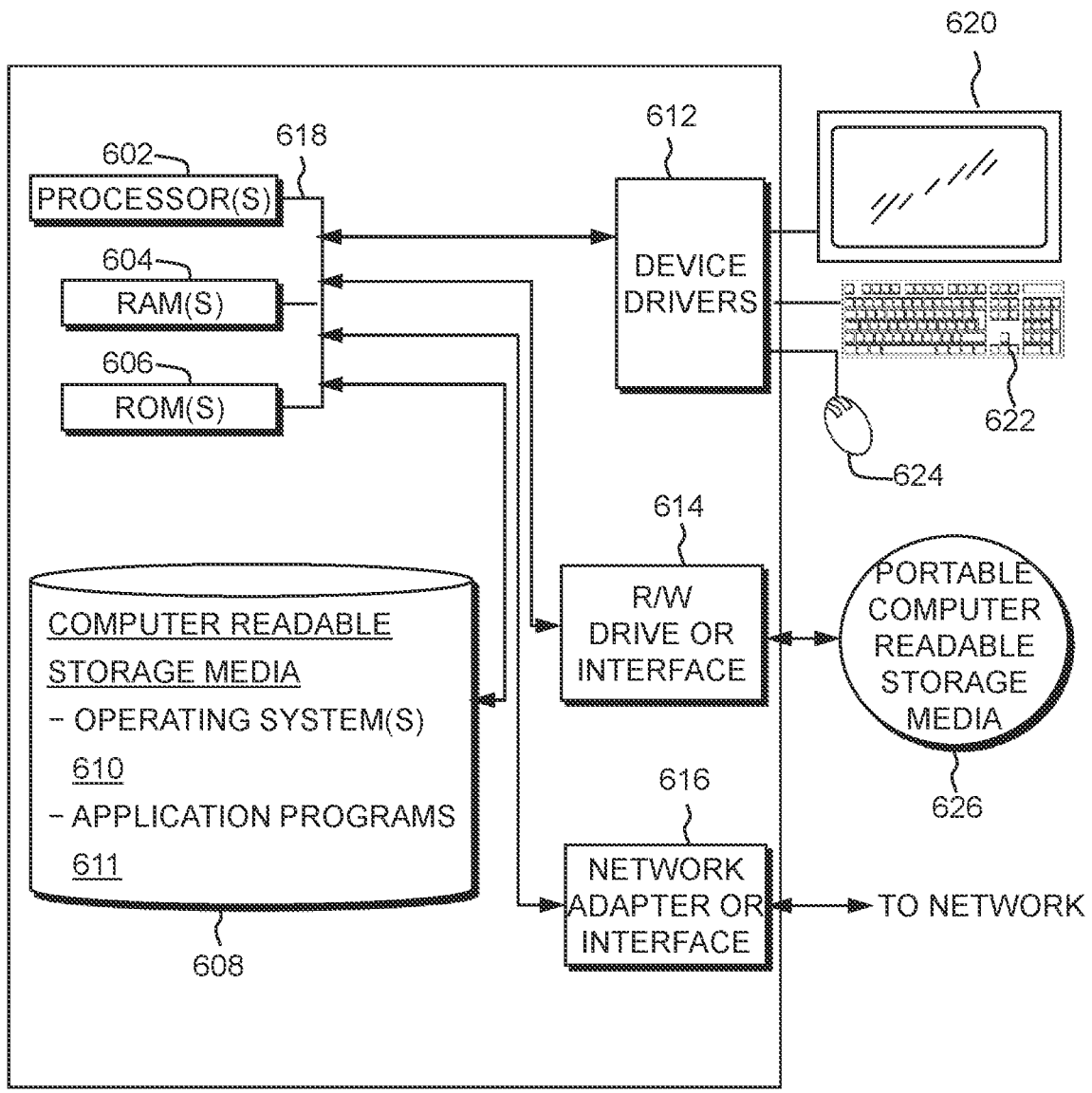
FIG. 6 is a block diagram of an embodiment of a computer system or cloud server in which embodiments of the present invention may be implemented.

FIG. 6 depicts a block diagram of components of a computing system as used for the incident management system 500, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective RAY drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, RAY drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
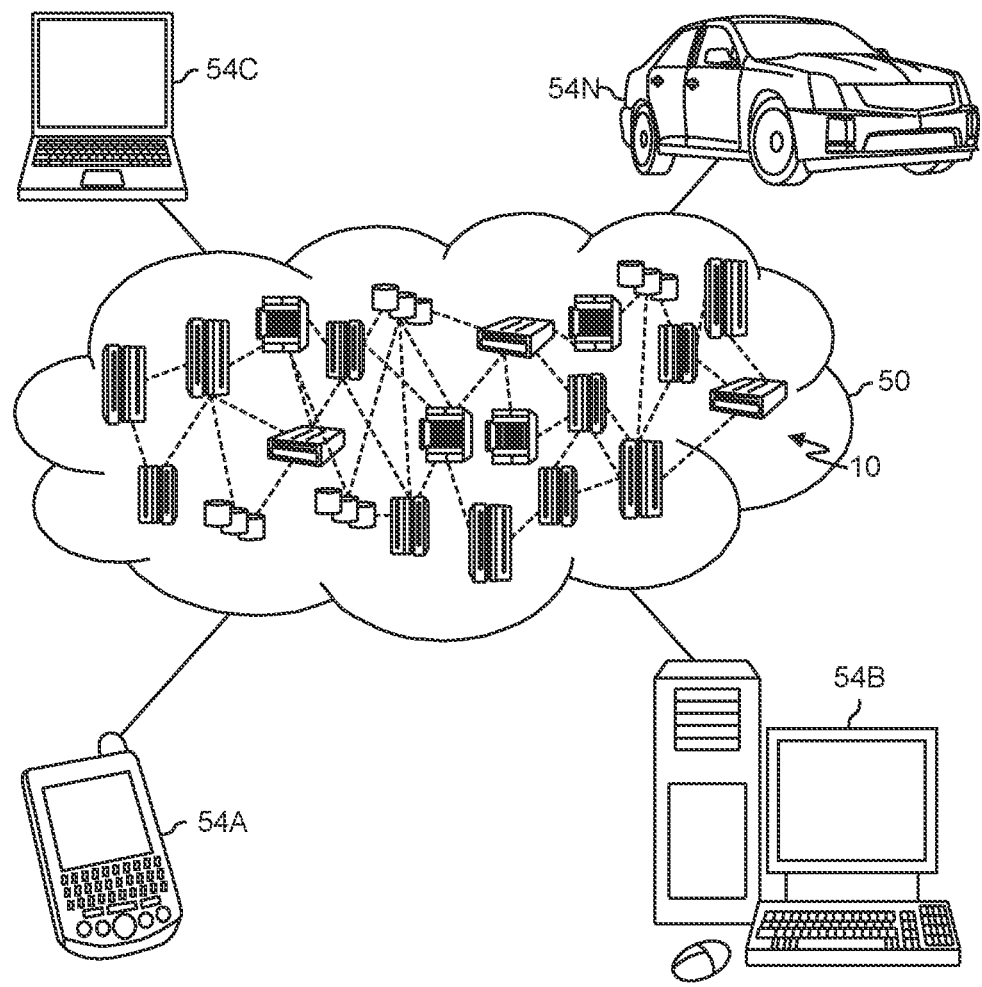
FIG. 7 is a schematic diagram of a cloud computing environment in which embodiments of the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
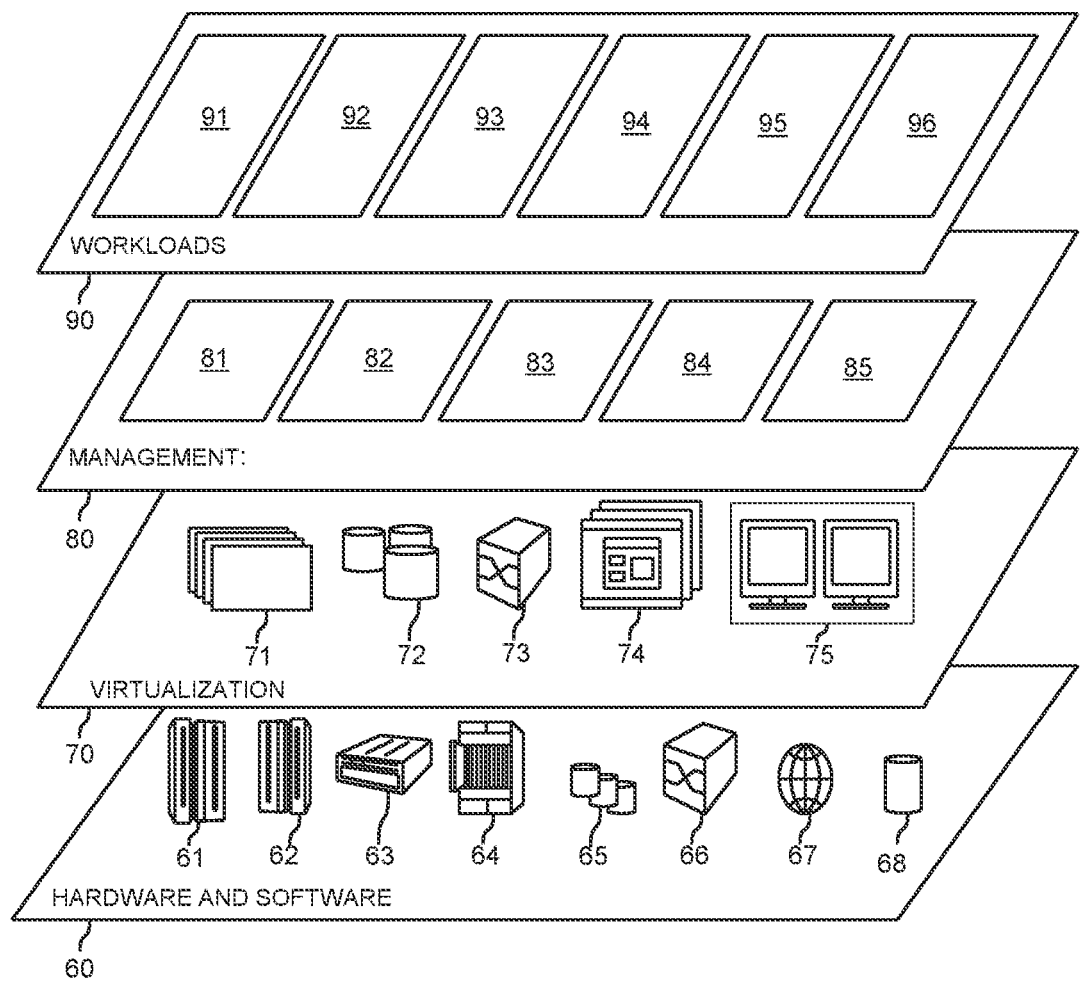
FIG. 8 is a diagram of abstraction model layers of a cloud computing environment in which embodiments of the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and incident processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

FURTHER COMMENTS AND/OR EMBODIMENTS

Other embodiments and/or advantages of the present invention may be described further below:

One method of the embodiment can comprise of categorizing incident instances as incident types, wherein an incident instance includes one or more events having resources identifying one or more hosts specific to the incident instance and wherein an incident type categorizes incident instances having a common underlying problem with the incident type having generalized resources; and generating decision instructions for an incident type wherein the decision instructions provide generalized command steps for interacting with hosts for the resolution of incident instances of the incident type.

Another method of the embodiment can comprise of determining an incident type of a current incident instance wherein an incident type categorizes incident instances having a common underlying problem with the incident type having generalized resources; referencing decision instructions provided for the incident type wherein the decision instructions provide generalized command steps for interacting with the generalized resources for the resolution of incident instances of the incident type; and converting generalized resources of the incident type to one or more hosts specific to the current incident instance identified from one or more events in the current incident instance.

Furthermore, both methods mentioned above can be further described with the following details:

The method has the advantage of generating decision instructions for an incident type in order to gather sufficient data to create instructions for incidents.

The method may include resolving a current incident instance by determining a current position in the decision instructions of an incident type in which the current incident instance is categorized and progressing through the decision instructions. Resolving a current incident instance may include converting a generalized resource in the incident type to one or more hosts specific to the incident instance identified from events in the current incident instance. This has the advantage of providing instructions at a current point in an incident.

The method may include converting the decision instructions for an incident type to a set of prompts in the form of a conversation tree of an online messaging interface for user interaction with the decision instructions. This has the advantage of providing the instructions in the form of an online chat. This may be integrated into a support collaboration environment.

Categorizing incident instances as incident types may be based on one or more of the groups of: events within an incident instance; steps taken by an operator to resolve an incident instance; tickets raised against an incident instance; and teams and/or operators assigned to an incident instance.

The method may include generating categories of incident types based on analysis of a set of resolved incident instance sessions with initially generalized commands and responses to and from one or more problem hosts. The method may include initially generalizing commands by parameterizing any matches between the originating event attributes and command arguments.

Generating categories of incident types may include generalizing resources of an incident type by: identifying common resource fields within events of a subset of incident instances of the incident type used to connect to one or more problem hosts; and generalizing the common resource fields across a threshold of the subset of resolved incident instances as contextual host information for the incident type.

Generating decision instructions for an incident type may be based on analysis of a set of resolved incident instance sessions of the incident type with initially generalized commands and responses to and from one or more generalized resources.

The method may include further generalizing commands and responses for the decision instructions by building on the initial generalization with further generalization parameterizing any command arguments which appear in the responses from previous commands and correspond to each other.

Generating decision instructions for an incident type includes may include comparing commands to: add common sub-sequences of complete commands to the instructions, with one node per command with an incoming directed connection to any previous commands; add divergent sub-sequences of complete commands as conditional paths in the instructions based on tokenized parameters; and process and add common sub-sequences of partial commands to the instructions.

The method may include, for each set of similar generalized commands, identifying variation sources.

The decision instructions may be provided as a decision tree having generalized commands.

The method may include resolving the current incident instance by determining a current position in the decision instructions of an incident type in which the current incident instance is categorized and progressing through the decision instructions.

The method may include carrying out a command in the decision instructions automatically or with a confirmation input based on whether the command is system affecting or non-system affecting.

The method may include providing the decision instructions through interaction with messaging prompts converted from the decision instructions.

Now, another embodiment of a system is described below:

One system can comprise of an incident type categorizing component for categorizing incident instances as incident types, wherein an incident instance includes one or more events having resources identifying one or more hosts specific to the incident instance and wherein an incident type categorizes incident instances having a common underlying problem with the incident type having generalized resources; and a decision instruction generating component for generating decision instructions for an incident type wherein the decision instructions provide generalized command steps for interacting with hosts for the resolution of incident instances of the incident type.

Another system can comprise of an incident type determining component for determining an incident type of a current incident instance wherein an incident type categorizes incident instances having a common underlying problem with the incident type having generalized resources; an instruction referencing component for referencing decision instructions provided for the incident type wherein the decision instructions provide generalized command steps for interacting with the generalized resources for the resolution of incident instances of the incident type; and a resource converting component for converting generalized resources of the incident type to one or more hosts specific to the current incident instance identified from one or more events in the current incident instance.

Furthermore, both methods mentioned above can be further described with the following details:

The system may include a position component for resolving the current incident instance by determining a current position in the decision instructions of an incident type in which the current incident instance is categorized and progressing through the decision instructions.

The system may include a command automation component for carrying out a command in the decision instructions automatically or with a confirmation input based on whether the command is non-system affecting.

What is claimed is:

1. A computer-implemented method for providing decision instructions for problem incidents in information technology (IT) systems, said method carried out by one or more processors of a computer system and comprising:
   categorizing incident instances as incident types, wherein an incident instance includes one or more events having resources identifying one or more hosts specific to the incident instance and wherein an incident type categorizes incident instances having a common underlying problem with the incident type having generalized resources; and
   generating decision instructions for an incident type wherein the decision instructions provide generalized command steps for interacting with hosts for resolution of incident instances of the incident type.

2. The computer-implemented method of claim 1, including:
   resolving a current incident instance by determining a current position in the decision instructions of an incident type in which the current incident instance is categorized and progressing through the decision instructions.

3. The computer-implemented method of claim 2, wherein resolving a current incident instance includes converting a generalized resource in the incident type to one or more hosts specific to the incident instance identified from events in the current incident instance.

4. The computer-implemented method of claim 1, including:
   converting the decision instructions for an incident type to a set of prompts in form of a conversation tree of an online messaging interface for user interaction with the decision instructions.

5. The computer-implemented method of claim 1, wherein categorizing incident instances as incident types is based on one or more of groups of: events within an incident instance; steps taken by an operator to resolve an incident instance; tickets raised against an incident instance; and teams and/or operators assigned to an incident instance.

6. The computer-implemented method of claim 1, including generating categories of incident types based on analysis of a set of resolved incident instance sessions with initially generalized commands and responses to and from one or more problem hosts.

7. The computer-implemented method of claim 1, including initially generalizing commands by parameterizing any matches between originating event attributes and command arguments.

8. The computer-implemented method of claim 7, wherein generating categories of incident types includes generalizing resources of an incident type by:
   identifying common resource fields within events of a subset of incident instances of the incident type used to connect to one or more problem hosts; and
   generalizing the common resource fields across a threshold of subset of resolved incident instances as contextual host information for the incident type.

9. The computer-implemented method of claim 1, wherein generating decision instructions for an incident type is based on analysis of a set of resolved incident instance sessions of the incident type with initially generalized commands and responses to and from one or more generalized resources.

10. The computer-implemented method of claim 9, including further generalizing commands and responses by building on the initial generalization with further generalization parameterizing any command arguments which appear in the responses from previous commands and correspond to each other.

11. The computer-implemented method of claim 10, wherein generating decision instructions for an incident type includes comparing commands to:
   add common sub-sequences of complete commands to the instructions, with one node per command with an incoming directed connection to any previous commands;

add divergent sub-sequences of complete commands as conditional paths in the instructions based on tokenized parameters; and process and add common sub-sequences of partial commands to the instructions.

12. The computer-implemented method of claim 10, including for each set of similar generalized commands, identify variation sources.

13. The computer-implemented method of claim 1, wherein the decision instructions are provided as a decision tree having generalized commands.

14. A system for providing decision instructions for problem incidents in information technology (IT) systems, comprising:

a processor and a memory configured to provide computer program instructions to the processor to execute the computer program instructions, wherein steps of the computer program instructions further comprising function of the components:

categorizing incident instances as incident types, wherein an incident instance includes one or more events having resources identifying one or more hosts specific to the incident instance and wherein an incident type categorizes incident instances having a common underlying problem with the incident type having generalized resources; and generating decision instructions for an incident type wherein the decision instructions provide generalized command steps for interacting with hosts for resolution of incident instances of the incident type;

an incident type categorizing component for categorizing incident instances as incident types, wherein an incident instance includes one or more events having resources identifying one or more hosts specific to the incident instance and wherein an incident type categorizes incident instances having a common underlying problem with the incident type having generalized resources; and a decision instruction generating component for generating decision instructions for an incident type wherein the decision instructions provide generalized command steps for interacting with hosts for the resolution of incident instances of the incident type.

15. The system of claim 14, including:

a current incident resolving component for resolving a current incident instance by determining a current position in the decision instructions of an incident type in which the current incident instance is categorized and progressing through the decision instructions.

16. The system of claim 15, further comprising:

resolving a current incident instance by determining a current position in the decision instructions of an incident type in which the current incident instance is categorized and progressing through the decision instructions;

wherein the current incident resolving component includes a resource converting component for converting a generalized resource in the incident type to one or more hosts specific to the incident instance identified from events in the current incident instance.

17. The system of claim 14, including:

converting the decision instructions for an incident type to a set of prompts in form of a conversation tree of an online messaging interface for user interaction with the decision instructions;

a prompt conversion component for converting the decision instructions for an incident type to a set of prompts in the form of a conversation tree of an online messaging interface for user interaction with the decision instructions.

18. A computer program product for providing decision instructions for problem incidents in information technology (IT) systems, the computer program product comprising a computer readable storage medium having program instructions embodied therewith, the program instructions executable by a processor to cause the processor to:

categorize incident instances as incident types, wherein an incident instance includes one or more events having resources identifying one or more hosts specific to the incident instance and wherein an incident type categorizes incident instances having a common underlying problem with the incident type having generalized resources; and generate decision instructions for an incident type wherein the decision instructions provide generalized command steps for interacting with hosts for resolution of incident instances of the incident type.

* * * * *